(12) United States Patent
Iwasa et al.

(10) Patent No.: US 6,985,201 B2
(45) Date of Patent: Jan. 10, 2006

(54) REFLECTIVE LIQUID CRYSTAL DISPLAY DEVICE

(75) Inventors: Takayuki Iwasa, Yamato (JP); Toshihiko Nishihata, Yokohama (JP)

(73) Assignee: Victor Company of Japan, Ltd., (JP)

( * ) Notice: Subject to any disclaimer, the term of this patent is extended or adjusted under 35 U.S.C. 154(b) by 0 days.

(21) Appl. No.: 10/712,923

(22) Filed: Nov. 13, 2003

(65) Prior Publication Data

US 2004/0095540 A1 May 20, 2004

(30) Foreign Application Priority Data

Nov. 18, 2002 (JP) .............................. 2002-334310

(51) Int. Cl.
*G02F 1/1335* (2006.01)
(52) U.S. Cl. ...................................... 349/137; 349/110
(58) Field of Classification Search ................ 349/137, 349/113, 44, 110, 38; 313/503
See application file for complete search history.

(56) References Cited

U.S. PATENT DOCUMENTS

| | | | | |
|---|---|---|---|---|
| 5,592,317 A | * | 1/1997 | Fujikawa et al. | ........... 349/110 |
| 5,978,056 A | * | 11/1999 | Shintani et al. | ............. 349/137 |
| 6,156,640 A | * | 12/2000 | Tsai et al. | .................... 438/636 |
| 6,198,215 B1 | * | 3/2001 | Niboshi et al. | ............. 313/503 |
| 6,285,424 B1 | * | 9/2001 | Yoshida | ....................... 349/110 |
| 6,589,658 B1 | * | 7/2003 | Stachowiak | ................. 428/432 |
| 6,791,649 B1 | * | 9/2004 | Nakamura et al. | .......... 349/137 |

FOREIGN PATENT DOCUMENTS

| | | |
|---|---|---|
| JP | 2000-193994 | 7/2000 |
| JP | 2000-216161 | 8/2000 |

* cited by examiner

*Primary Examiner*—Toan Ton
(74) *Attorney, Agent, or Firm*—Renner, Kenner, Greive, Bobak, Taylor & Weber

(57) ABSTRACT

A reflective liquid crystal display device has at least one anti-reflection layer made of a metallic film and a silicon oxynitride film that exhibits low reflectivity against light beams which may otherwise be incident into pixel switching transistors. At least one pair of pixel switching transistor and a capacitor are formed on a semiconductor substrate. The transistor and the capacitor are electrically isolated from each other. A first interlayer insulating layer is formed on the transistor and the capacitor. A wiring layer is formed on the first interlayer insulating layer. A second interlayer insulating layer is formed over the wiring layer. A light shielding layer is formed on the second interlayer insulating layer. A third interlayer insulating layer is formed over the light shielding layer. At least one pixel electrode is formed on the third interlayer insulating layer. A common electrode is formed over the pixel electrode. A light-transmissive substrate is formed on the common electrode. A liquid crystal layer is provided between the pixel electrode and the common electrode. An anti-reflection layer is formed on, at least, either the wiring layer or the light shielding layer. The anti-reflection layer is a double layer of a metallic film and a silicon oxynitride film that exhibits a refraction index different from a refraction index of the third interlayer insulating layer.

27 Claims, 13 Drawing Sheets

REFLECTIVE LIQUID CRYSTAL DISPLAY DEVICE

BACKGROUND OF THE INVENTION

The present invention relates to a reflective liquid crystal display device used for displaying images with reflection of read light beams modulated in accordance with video signals.

There are strong demands for projection-type display apparatus for displaying images on a large screen, such as, apparatus for outdoor public use or those for use in airport control towers, high-precision display apparatus for high vision and projectors.

The projection-type display apparatus is classified into transmission and reflective types, both using a liquid crystal display device. In operation, a read light beam incident into a liquid crystal display device is modulated per pixel in accordance with a video signal, thus converted into a light beam to be projected onto a screen.

Liquid crystal display devices are equipped with an active-matrix substrate aligned on which are switching transistors such as thin-film transistors and pixel electrodes to which voltages are supplied while controlled by the switching transistors. Formed over the active-matrix substrate is a common electrode coated with a light-transmissive substrate (such as a glass substrate). A liquid crystal layer is provided between the active-matrix substrate and the common electrode.

A voltage across the common electrode and each pixel electrode is varied in accordance with a video signal to control orientation of a liquid crystal filled in the liquid crystal layer for modulation of a read light beam.

The liquid crystal display device is also classified into transmission and reflective types.

Transmission-type liquid crystal display devices are equipped with liquid-crystal drive circuitry and wirings in a liquid crystal panel with a width of about 10 $\mu$m around pixel electrodes.

This configuration causes a low ratio (aperture) of a pixel area to the total displaying area in the liquid crystal panel. The aperture is more or less 60% even for a transmission-type liquid crystal display device having a highest aperture at present.

Display apparatus such as liquid crystal projectors equipped with the transmission-type liquid crystal display device cannot display images of high intensity because of decrease in aperture due to increase in the number of pixels, thus increase in pixel density, or resolution.

Accordingly, developed and put in practical use recently, instead of transmission-type liquid crystal display devices, are reflective liquid crystal display devices that give high intensity and resolution.

Discussed next are problems caused for known reflective liquid crystal display devices.

Illustrated in FIG. 1 is a cross section of a known reflective liquid crystal display device for each pixel.

Provided on a semiconductor substrate 10 (a P-type silicon substrate) are pixel switching transistor Tr and a capacitor C. The transistor Tr and the capacitor C are electrically isolated by an $SiO_2$ field oxide film 12.

The pixel switching transistor Tr is formed on an N-type well 14. It is an MOSFET constituted by a drain 16 and a source 18, each a highly-dense impurity layer, and a gate electrode 20 situated therebetween via a gate oxide film.

The capacitor C is constituted by a lower electrode (highly-dense impurity layer) 22 and an upper electrode 24 formed over the lower electrode 22 via an insulating film, for storing charges.

Formed over the pixel switching transistor Tr and the capacitor C is a first $SiO_2$ interlayer insulating layer 26, patterned on which is an Al wiring layer 28. Formed on the wiring layer 28 is a second $SiO_2$ interlayer insulating layer 30.

Patterned on the second interlayer insulating layer 30 is an Al light shielding layer 32 for light shielding so that a reading light beam is hardly be incident below the shielding layer 32. Formed on the light shielding layer 32 is a third $Sio_2$ interlayer insulating layer 34.

Moreover, formed on the third interlayer insulating layer 34 is a quadrangular Al pixel electrode 4 that is connected to the source 18 of the pixel switching transistor Tr and the upper electrode 24 of the capacitor C, via the light shielding layer 32.

Multiple pixel electrodes 4 are arranged into a matrix over a liquid crystal panel, with a gap 36 between two adjacent pixel electrodes, thus constituting an active matrix substrate.

Provided as facing the multiple pixel electrodes 4 is a transparent common electrode 38 with a light-transmissive (glass-like) substrate 40 formed thereon.

Formed between the multiple pixel electrodes 4 and the transparent common electrode 38 is a liquid crystal layer LC filled with a liquid crystal.

The common electrode 38 is provided as covering over multiple pixels Px. In addition, alignment films (not shown) are formed on the pixel electrodes 4 and the common electrode 38.

The width of each gap 36 between two adjacent pixel electrodes 4, the area without serving light modulation in this type of reflective liquid crystal display device, is about in the range from 0.5 to 0.7 $\mu$m. Therefore, reflective liquid crystal display devices having a pixel-electrode pitch of, for example, 14 $\mu$m can have aperture in the range from 90 to 93%.

In operation, a reading light beam LT is incident via the light-transmissive substrate 40, as indicated by dot lines in FIG. 1.

It is inevitable that some light components of the light beam LT are incident into the active-matrix substrate as intruding beams LTi via the gaps 36.

Each intruding beams LTi propagates between the pixel electrode 4 and the light-shielding layer 32 and also the shielding layer 32 and the wiring layer 28 while reflected therebetween, as indicated by dot lines.

The intruding beam LTi is finally incident into the drain 16 and/or the source 18 that constitute a PN-junction photo diode. This generates photo carriers to cause a leak current, thus resulting in variation in voltage at the pixel electrode 4, which is a cause of flickering or burn-in.

Such light intrusion could be prevented by a long optical path of each intruding beam LTi with a large pixel electrode 4. Nevertheless, it goes against the trend of pixel miniaturization, and hence cannot be employed.

In order to solve such a problem, for example, Japanese Unexamined Patent Publication No. 2000-193994 discloses an anti-reflection (reflection protective) layer 42 formed on the light-shielding layer 32 before the third interlayer insulating layer 34 formed thereon, as shown in FIG. 1, to attenuate the intruding beams LTi.

The anti-reflection layer 42 is made of a single layer of titanium nitride (TiN) or a double layer of silicon nitride (SiN) and TiN, an SiN film being formed on a TiN film.

Reflective liquid crystal display devices with a single liquid crystal panel use a read light beam within a visible-light having wavelengths of 4000 to 7000 Å. The titanium nitride of the anti-reflection layer 42 can be adjusted as exhibiting a low reflectivity against some wavelengths, but not all wavelengths in the visible-light range, thus reflection blocking being not enough. This is the same for the TiN/SiN anti-reflection layer.

Reflection of intruding light beams may be blocked on each panel in reflective liquid crystal display devices with three liquid crystal panels of red, blue and green. For instance, a anti-reflection 42 used in a liquid crystal panel for red can be adjusted as having a thickness to exhibit a low reflectivity against light of wavelength in the range from 6000 to 7000 Å for red. Nevertheless, this results in difference in thickness for anti-reflection layers in the liquid crystal panels for red, blue and green. In other words, common liquid crystal panels cannot be used for red, blue and green, which causes low productivity.

SUMMARY OF THE INVENTION

A purpose of the present invention is to provide a reflective liquid crystal display device with no decrease in performance of pixel transistors which may otherwise be caused by a light beam incident into each transistor via a gap between pixel electrodes.

The present invention provides a reflective liquid crystal display device comprising: a semiconductor substrate; at least one pair of pixel switching transistor and a capacitor formed on the semiconductor substrate and electrically isolated from each other; a first interlayer insulating layer formed on the pixel switching transistor and the capacitor; a wiring layer formed on the first interlayer insulating layer; a second interlayer insulating layer formed over the wiring layer; a light shielding layer formed on the second interlayer insulating layer; a third interlayer insulating layer formed over the light shielding layer; at least one pixel electrode formed on the third interlayer insulating layer; a common electrode formed over the pixel electrode; a liquid crystal layer provided between the pixel electrode and the common electrode; a light-transmissive substrate formed on the common electrode; and at least one anti-reflection layer formed on either the wiring layer or the light shielding layer, the anti-reflection layer being a double layer of a metallic film and a silicon oxynitride film that exhibits a refraction index different from a refraction index of the third interlayer insulating layer.

DETAILED DESCRIPTION OF PREFERRED EMBODIMENT

An embodiment according to the present invention will be disclosed with reference to the attached drawings.

Figure 2:
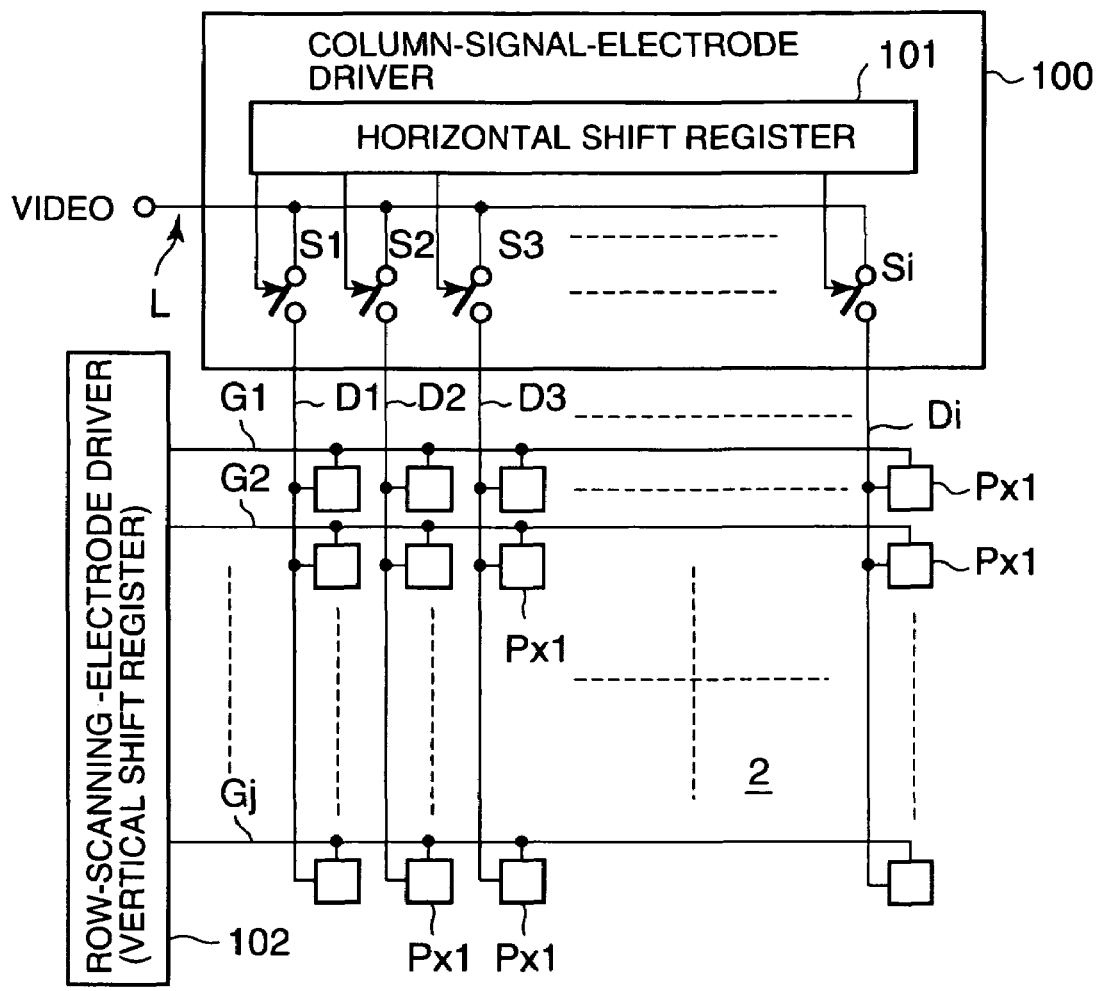
FIG. 2 shows a schematic block diagram of a liquid crystal display apparatus.
Figure 3:
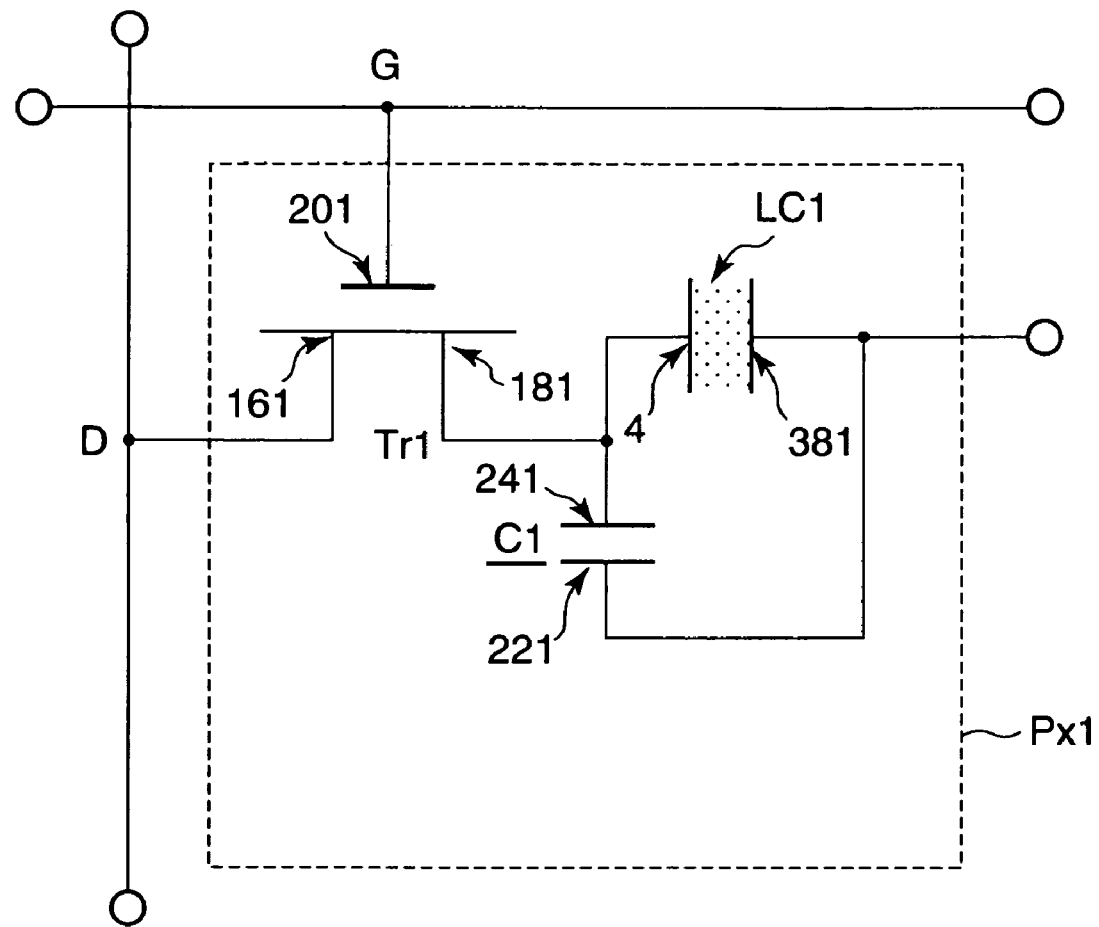
FIG. 3 shows a circuit provided for each pixel in the liquid crystal display apparatus shown in FIG. 2.

Explained first with reference to FIGS. 2 and 3 is a liquid crystal display apparatus with drive circuitry in which an embodiment of a reflective liquid crystal display device according to the present invention can be installed.

In FIG. 2, column-signal electrodes D1, D2, D3, . . . , and Di are aligned on a semiconductor substrate 2. Also aligned on the substrate 2 are row-scanning electrodes G1, G2, G3, . . . , and Gj, intersecting with the column-signal electrodes.

Provided at the intersection of each column-signal electrode D (D1, D2, D3, . . . , or Di) and the corresponding row-scanning electrode G (G1, G2, G3, . . . , or Gj) is a pixel Px1 having a pixel-switching transistor Tr1, a capacitor C1, and a liquid crystal layer LC1, as shown in FIG. 3. Multiple pixels Px1 are arranged into a matrix.

A column-signal-electrode driver 100 is equipped with a horizontal shift register 101 and several video switches S1, S2, S3, . . . , and Si.

Input terminals of the video switches S1, S2, S3, . . . , and Si are connected to a video-signal supply line L through which a video signal VIDEO is supplied. Output terminals of the switches S1, S2, S3, . . . , and Si are connected to the column-signal electrodes D1, D2, D3, . . . , and Di, respectively. A control terminal of each switch S (S1, S2, S3, . . . , or Si) is connected to the corresponding output of the horizontal shift register 101.

The horizontal shift register 101 is driven by a horizontal start signal and a horizontal clock signal to output pulses. The start and horizontal clock signals are supplied from a drive timing pulse generator (not shown).

The pulses output from the horizontal shift register 101 are supplied to the video switches S1, S2, S3, . . . , and Si, to sequentially turn on these switches. The turn-on switches allow the video signal VIDEO for one horizontal period to be sequentially supplied to the column-signal electrodes D1, D2, D3, ..., and Di.

A row-scanning-electrode driver 102 is equipped with a vertical shift register having several register stages corresponding to the number of rows to be displayed.

The vertical shift register is driven by a vertical start signal and a vertical shift clock signal synchronizing with one horizontal period to output scanning pulses. The start and vertical shift clock signals are supplied from a drive timing pulse generator (not shown).

The scanning pulses output from the vertical shift register are sequentially supplied to the row-scanning electrodes G1, G2, G3, ..., and Gj per horizontal period (per row).

The scanning pulses turn on, sequentially per row, the pixel-switching transistors Tr1 connected to the row-scanning electrodes G1, G2, G3, ..., and Gj.

Each turned-on pixel-switching transistor Tr1 shown in FIG. 3 allows the video signal VIDEO, supplied to the corresponding column-signal electrode D, to be stored as charge information in the capacitor C1 of the corresponding pixel Px1.

The stored charge information is supplied to the liquid crystal layer LC1 via a pixel electrode 41 for light modulation. The light modulation provides images to be displayed corresponding to the video signal VIDEO.

Figure 4:
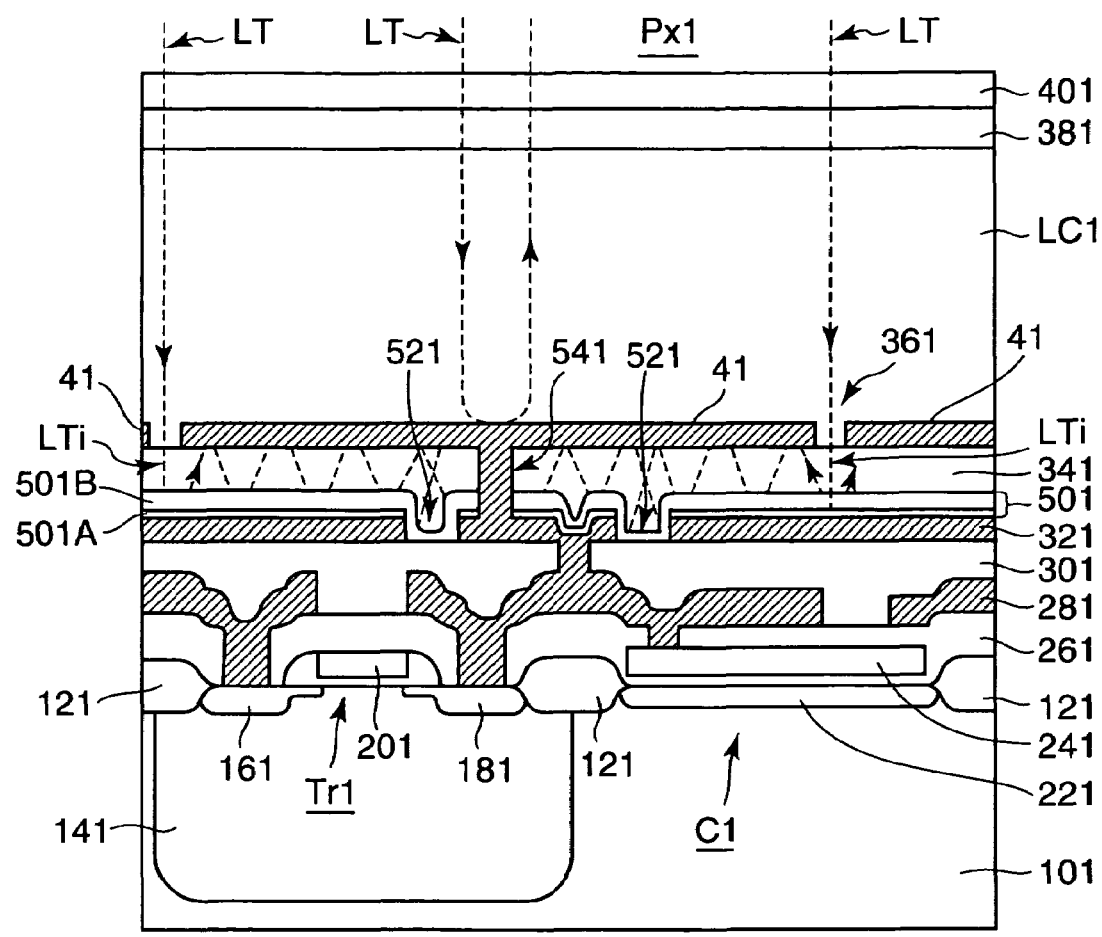
FIG. 4 shows a cross section of an embodiment of a liquid crystal display device for each pixel according to the present invention, installed in the liquid crystal display device apparatus shown in FIG. 2.

Disclosed now with reference to FIG. 4 is an embodiment of a reflective liquid crystal display device according to the present invention, which can be installed in the liquid crystal display apparatus shown in FIG. 2.

Figure 1:
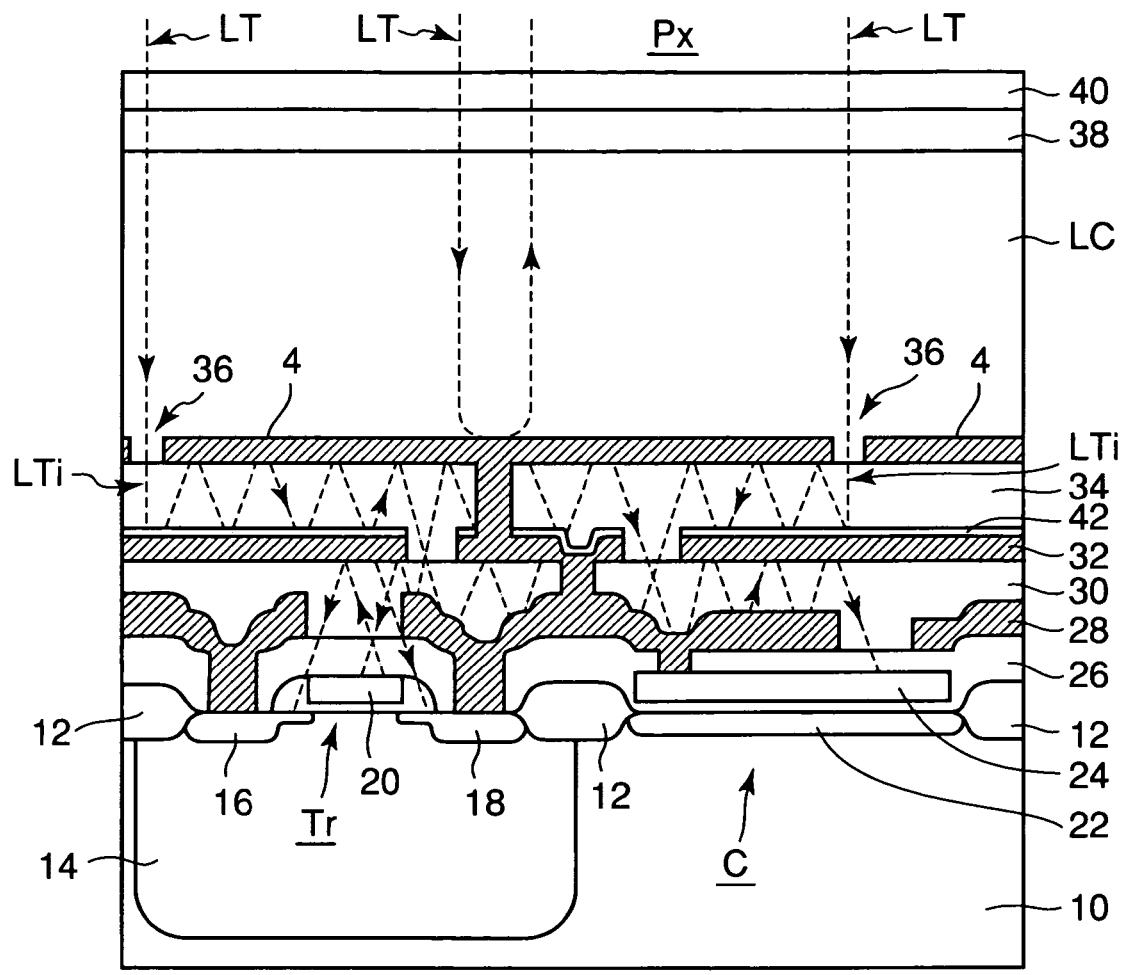
FIG. 1 shows a cross section of a known reflective liquid crystal display device for each pixel.

One particular feature of the reflective liquid crystal display device according to the present invention shown in FIG. 4 is an anti-reflection (reflection protective) layer made of a double layer of metal nitride, such as, a TiN (titanium nitride) film and an SiON (silicon oxynitride) film, different from single layer of TiN or a double layer of SiN and TiN for the anti-reflection layer 42 shown in FIG. 1.

Illustrated in FIG. 4 is a cross section of an embodiment of a reflective liquid crystal display device for each pixel according to the present invention.

Provided on a semiconductor substrate 101 (e.g., a P-type silicon substrate) are pixel switching transistor Tr1 and a capacitor C1 (FIG. 3). The transistor Tr1 and the capacitor C1 are electrically isolated by a field oxide film 121 made of, for example, $SiO_2$.

The pixel switching transistor Tr1 is formed on a well 141 of N-type, for example. It is an MOSFET constituted by a drain 161 and a source 181, each a highly-dense impurity layer, and a gate electrode 201 situated therebetween via a gate oxide film.

The capacitor C1 is constituted by a lower electrode (highly-dense impurity layer) 221 and an upper electrode 241 formed over the lower electrode 221 via an insulating film, for storing charges.

Formed over the pixel switching transistor Tr1 and the capacitor C1 is a first interlayer insulating layer 261 made of, for example $SiO_2$, patterned on which is a wiring layer 281 made of aluminum, for example. Formed on the wiring layer 281 is a second interlayer insulating layer 301 made of, for example, $SiO_2$.

Patterned on the second interlayer insulating layer 301 is a metallic light shielding layer 321 made of, for example aluminum, for light shielding so that a read light beam is hardly be incident below this shielding layer 321. Formed over the light shielding layer 321 is a third interlayer insulating layer 341 made of, for example, $SiO_2$.

Moreover, formed on the third interlayer insulating layer 341 is a pixel electrode 41 made of aluminum shaped into a quadrangular, for example, that is connected to the source 181 of the pixel switching transistor Tr1 and the upper electrode 241 of the capacitor C1, via the light shielding layer 321.

Multiple pixel electrodes 41 are arranged into a matrix over a liquid crystal panel, with a gap 361 between two adjacent pixel electrodes, thus constituting an active matrix substrate.

Provided as facing the multiple pixel electrodes 41 is a transparent common electrode 381 with a light-transmissive (glass-like) substrate 401 formed thereon.

Formed between the multiple pixel electrodes 41 and the transparent common electrode 381 is a liquid crystal layer LC1 filled with a liquid crystal.

The common on electrode 381 is provided as covering over multiple pixels Px1. In addition, alignment films (not shown) are formed on the pixel electrodes 41 and the common electrode 381.

Moreover, an anti-reflection layer 501 is formed directly on the light shielding layer 321 before the third interlayer insulating layer 341 is formed thereon. The anti-reflection layer 501 is one particular feature of the embodiment of the liquid crystal display device shown in FIG. 4.

The anti-reflection layer 501 is made of a double layer of metal nitride, such as, a TiN film 501A and an SiON film 501B formed thereon. The thicknesses of the TiN film 501A and the SiON film 501B are about 800 Å and 500 Å, respectively.

The SiON film 501B is an insulator so that it is formed not only on the TiN film 501A but also in the third interlayer insulating layer 341.

The SiON film 501B protects the pixel switching transistor Tr1 from an intruding light beam LTi which may otherwise be incident between two adjacent pixel electrodes 41, propagate between each pixel electrode 41 and TiN film 501A while being reflected therebetween, and finally reach the transistor Tr1.

The SiON film 501B is adjusted as exhibiting a reflectivity of about 1.80 whereas the third interlayer insulating layer 341 made of $SiO_2$ is adjusted as exhibiting a reflectivity of about 1.45. In other words, the SiON film 501B and the $SiO_2$-made third interlayer insulating layer 341 are adjusted as exhibiting different reflectivities.

The SiON film 501B is also formed in each gap 521 between two adjacent light shielding layers 321, the TiN film 501A being not formed therein, for further effective blocking of intrusion of the light beams LTi.

The anti-reflection layer 501 is formed, for example, as follows:

An aluminum film and a TiN film are formed in this order by sputtering, for forming the light shielding layer 321. The two films are etched by pattern etching simultaneously, thus the patterned light shielding layer 321 and also the TiN film 501 being formed.

The SiON film 501B is then formed by plasma CVD, followed by an $SiO_2$ film formed thereon, as the third interlayer insulating layer 341.

The SiON film 501B is an insulating film so that it exhibits almost the same etching rate as the $SiO_2$-made third interlayer insulating layer 341 formed thereon.

Therefore, the SiON film 501B (one composition of the anti-reflection layer 321) and the $SiO_2$ film (the third interlayer insulating layer 341) can be etched simultaneously in oxide-film etching to provide a via hole 541 (a through hole).

In other words, the via hole 541, the SiON film 501B and the third interlayer insulating layer 341 can be formed in a single process, with no necessity to have two etching processes, or any special etching process for the SiON film 501B.

Disclosed next is an operation of the reflective liquid crystal display device shown in FIG. 4 when installed in the liquid crystal display apparatus shown in FIG. 2.

A video signal VIDEO is supplied to the source 181 of the pixel switching transistor Tr1 via the video-signal supply line L and the column-signal electrodes D. Scanning pulses are then supplied to the gate electrode 221 of the capacitor C1 via the row-scanning electrodes G.

The pixel switching transistor Tr1 is thus turned on so that charges carried by the video signal VIDEO are stored in the capacitor C1 and also across the pixel electrode 41 and the transparent common electrode 381. This makes the video signal VIDEO being written in the liquid crystal layer LC1.

A read light beam LT is then incident into the liquid crystal layer LC1 via the light-transmissive substrate 401. The light beam LT is subjected to light modulation in accordance with the video signal VIDEO while passing through the liquid crystal layer LC1. The modulated light beam LT is reflected by the pixel electrode 41 and again subjected to light modulation while passing through the liquid crystal layer LC1. The re-modulated light beam LT is emitted from the light-transmissive substrate 401, as an image-information carrying light beam.

The image-information carrying light beam is projected onto a screen (not shown), thus an image being displayed thereon.

It is inevitable that some light components of the light beam LT are incident into the active-matrix substrate as intruding beams LTi via the gaps 361 each between two adjacent pixel electrodes 41.

Each intruding beam LTi is, however, absorbed by the anti-reflection layer 501 while repeatedly reflected between the pixel electrode 41 and this protective layer 501 made of the TiN film 501A and the SiON film 501B formed on the light shielding layer 321, as indicated by dot lines in FIG. 4.

Therefore, the intruding beam LTi is not incident below the anti-reflection layer 501. In other words, the anti-reflection layer 501 protects the pixel switching transistor Tr1 from the intruding beam LTi which may otherwise be incident therein.

As disclosed above, the present invention achieves high performance for the pixel switching transistor Tr1.

Discussed next is reflectively of the anti-reflection layer against wavelength in a visible-light range, evaluated with measurements with a reflectivity measuring instrument V-550 made by JASOCO, CO., and simulations.

Measurements and simulations were performed for the anti-reflection layer 501 (FIG. 4) in the embodiment of the reflective liquid crystal display device according to the present invention and also the counterpart layer 42 (FIG. 1) in the known display device.

Reflectivities of the anti-reflection layer 501 (FIG. 4) and the counterpart layer 42 (FIG. 1) were measured with thickness of TiN and/or SiON films and refraction index of the SiON film as parameters.

Measured as reflectivities were ratios of light beams reflected by the anti-reflection layer 501 (FIG. 4) to read light beams LT, visible light beams having wavelengths in the range from 4000 to 7000 Å, incident via the light-transmissive substrate 401. The same measurements were performed for the counterpart layer 42 (FIG. 1).

Examined first was the anti-reflection layer 42 (FIG. 1) made of an 800 Å-thick TiN film and a 500 Å-thick SiN film, in the known reflective liquid crystal display device.

Examined next was the anti-reflection layer 501 (FIG. 4) made of an 800 Å-thick TiN film and a 500 Å-thick SiON film, in the embodiment of the reflective liquid crystal display device according to the present invention.

Figure 5:
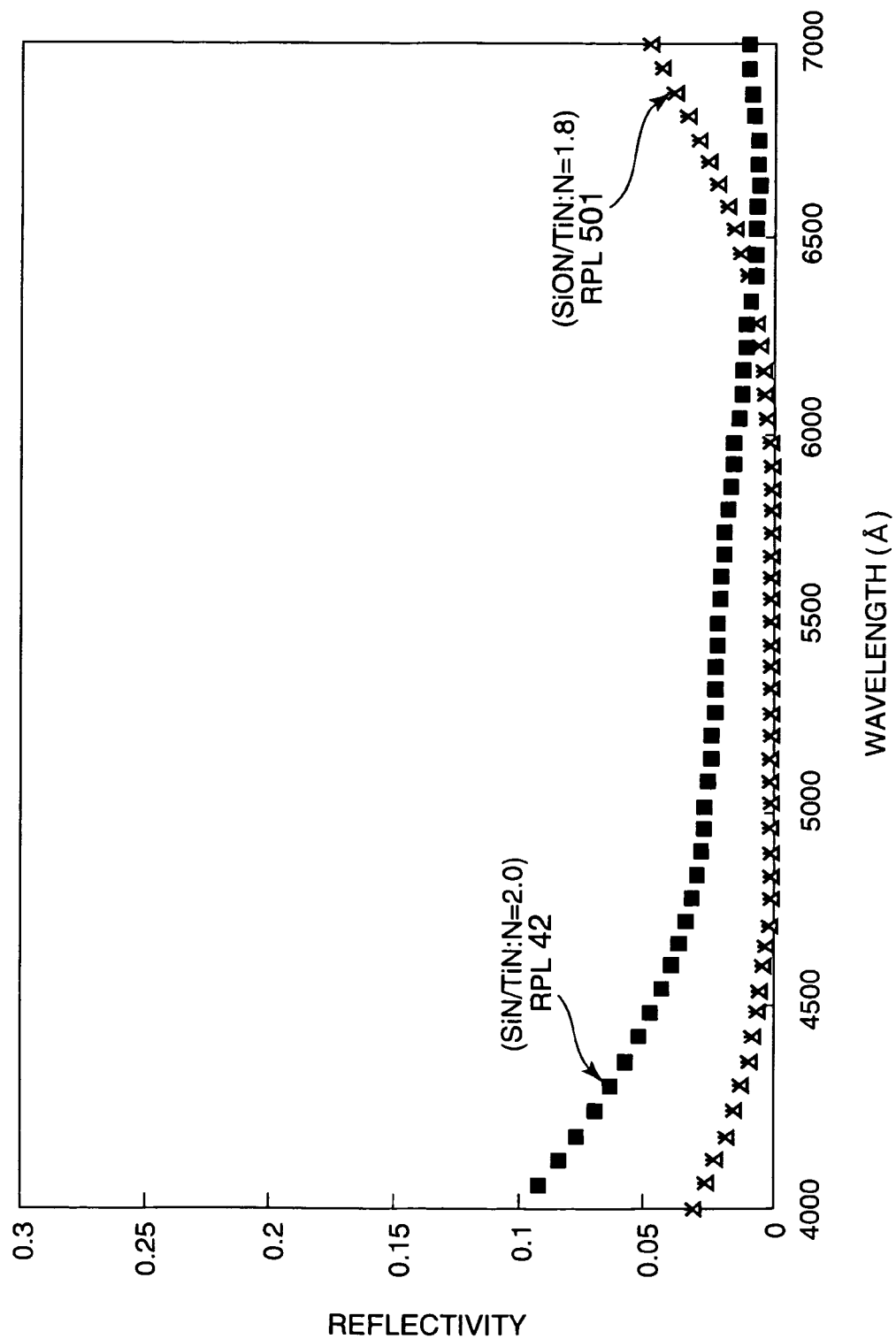
FIG. 5 shows change in reflectivity of anti-reflection layers in the present invention and the known liquid crystal display device against change in wavelength.

Reflectivities (100%=1) of these anti-reflection layers against wavelengths in a visible-light range are shown in FIG. 5.

Two curves in FIG. 5 represent change in reflectivity of the anti-reflection layer 501 (RPL 501 in the present invention) and the anti-reflection layer 42 (RPL 42 in the known liquid crystal display device) against change in wavelength.

These curves were given under the conditions: 800 Å (fixed) in thickness of the TiN film for both RPL 42 and 501; 500 Å (fixed) in thickness of both SiN and SiON films for RPL 42 and 501; and 2.0 and 1.8 in refraction index N for the SiN and SiON films, respectively.

FIG. 5 teaches that the RPL 501 (in the present invention) having SiON(500 Å)/TiN(800 Å) double-layer configuration exhibits lower reflectivity than the RPL 42 (in the known liquid crystal display device) having SiN(500 Å)/TiN (800 Å) double-layer configuration, over the wavelength in the range from 4000 to 7000 Å.

Moreover, the reflectivity is almost zero for the RPL 501 in the present invention against the wavelength from 4700 to 6000 Å.

It is evident from FIG. 5 that the SiON(500 Å)/TiN(800 Å) double-layer configuration in the present invention exhibits higher protection capability against reflection than the SiN(500 Å)/TiN(800 Å) double-layer configuration in the known liquid crystal display device.

Also shown in FIG. 5 is that the SiON(500 Å)/TiN(800 Å) double-layer configuration in the present invention exhibits reflectivity of 5% or less against the wavelength from 4000 to 6000 Å (visible-light range).

Figure 6:
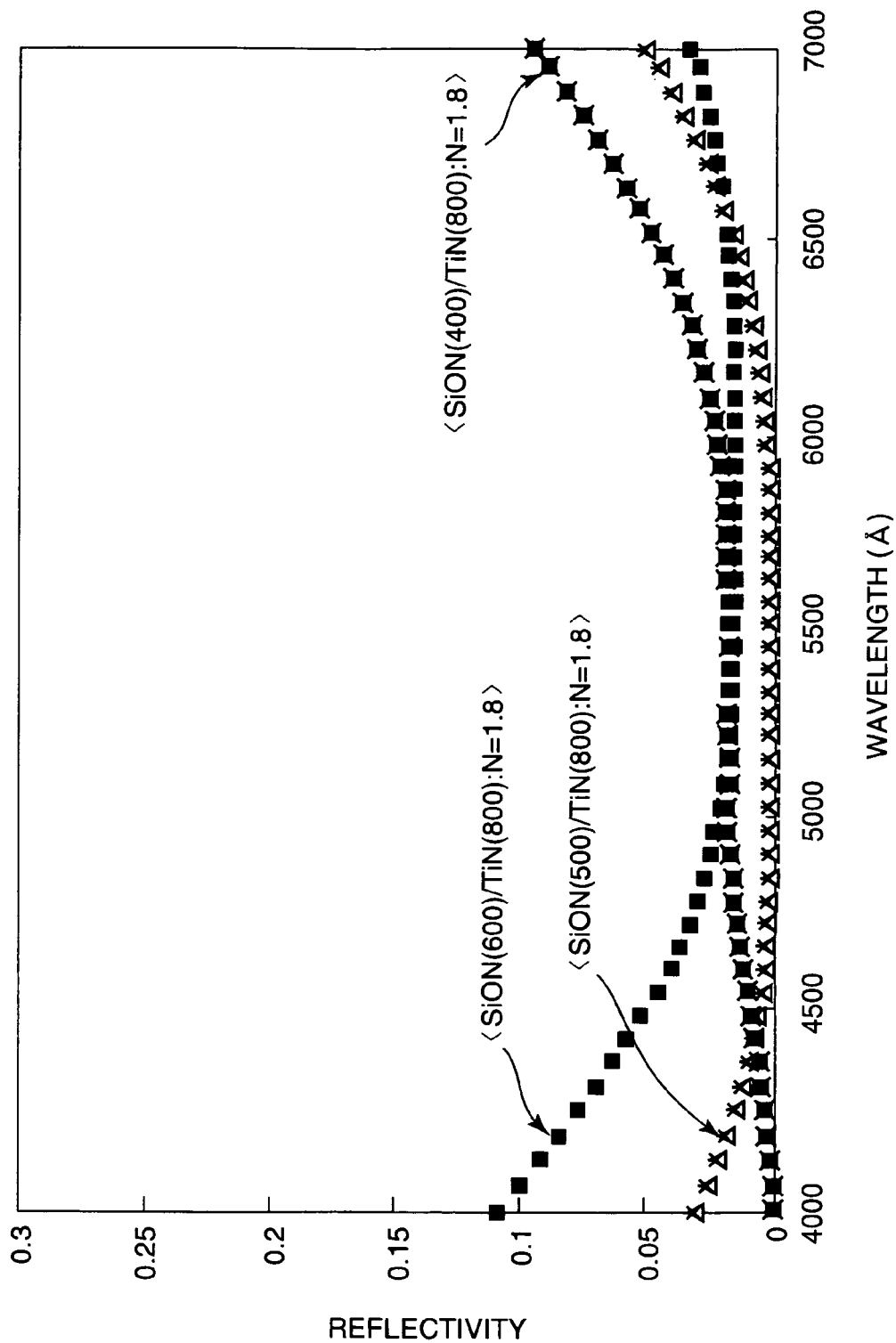
FIG. 6 shows change in reflectivity of the anti-reflection layer in the present invention against change in wavelength, with change in thickness (in optimum range) for the SiON film, one composition of the anti-reflection layer.

Discussed next with reference to FIG. 6 is reflectivity of the anti-reflection layer 501 having SiON/TiN double-layer configuration in the present invention against wavelength of visible-light range, with change in thickness for the SiON film.

Curves shown in FIG. 6 were given under the conditions: 800 Å (fixed) in thickness of the TiN film and 400 Å, 500 Å and 600 Å in thickness of the SiON film, with 1.8 in refraction index N for the SiON film.

FIG. 6 shows reflectivity (100%=1) of 10% or less over the wavelength in the range from 4000 to 7000 Å at 400 Å, 500 Å and 600 Å in thickness of the SiON film. The lowest reflectivity was given at 500 Å among the three thicknesses for the SiON film, with almost 0% at 500 Å in SiON thickness against the wavelength from 4700 to 6000 Å.

It is evident from FIG. 6 that the SiON/TiN double-layer configuration in the present invention exhibits higher protection capability against reflection, with thickness of 800 Å for the TiN film and thickness in the range from 400 to 600 Å for the SiON film.

In other words, the SiON/TiN double-layer configuration in the present invention under the conditions defined as above protects pixel switching transistors from intruding light beams incident between pixel electrodes. The intruding light beams may otherwise be reflected by the double-layer configuration and finally reach the transistors to decrease the performance thereof.

Figure 7:
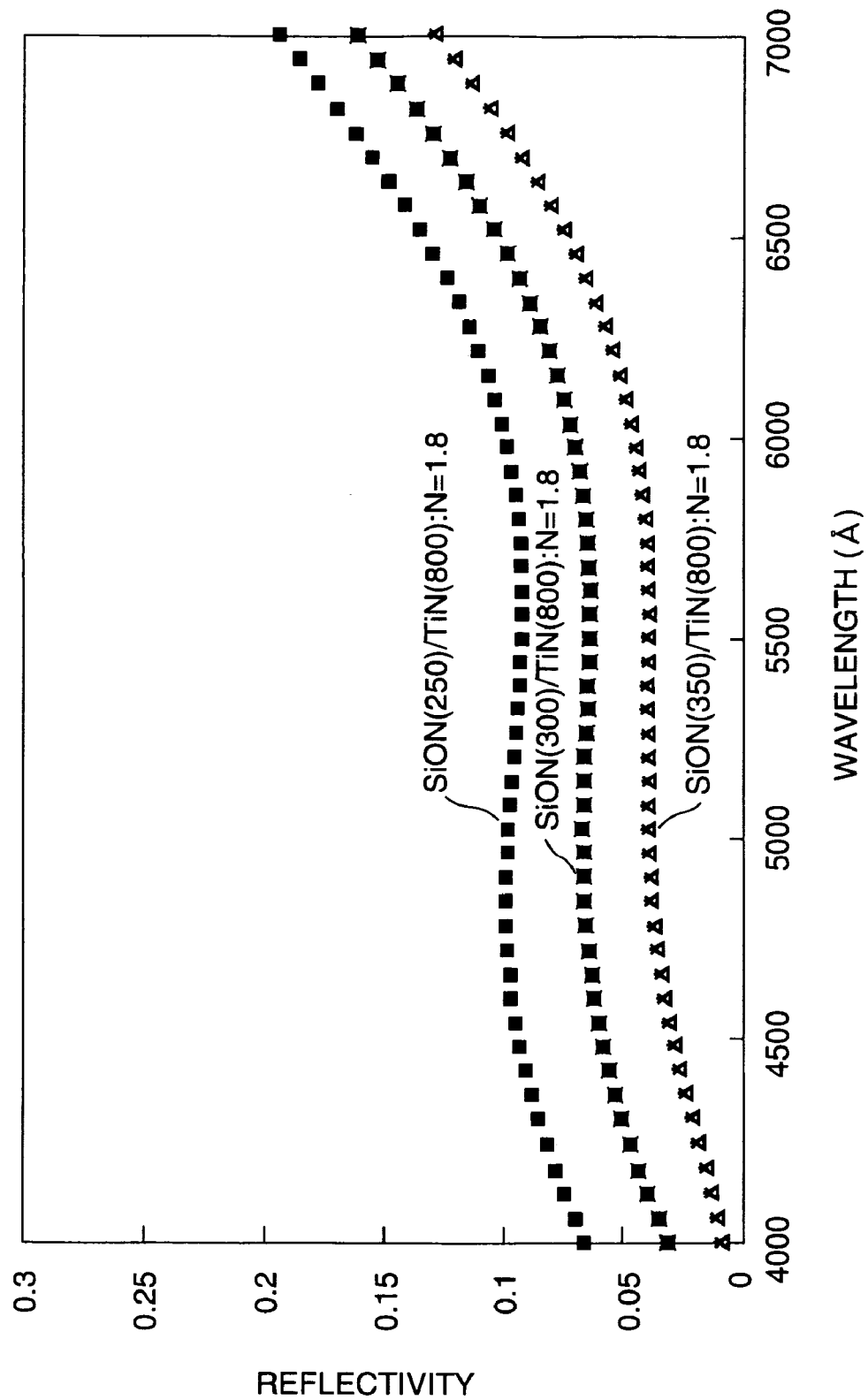
FIG. 7 shows change in reflectivity of the anti-reflection layer in the present invention against change in wavelength, with change in thickness (out of optimum range) for the SiON film.
Figure 8:
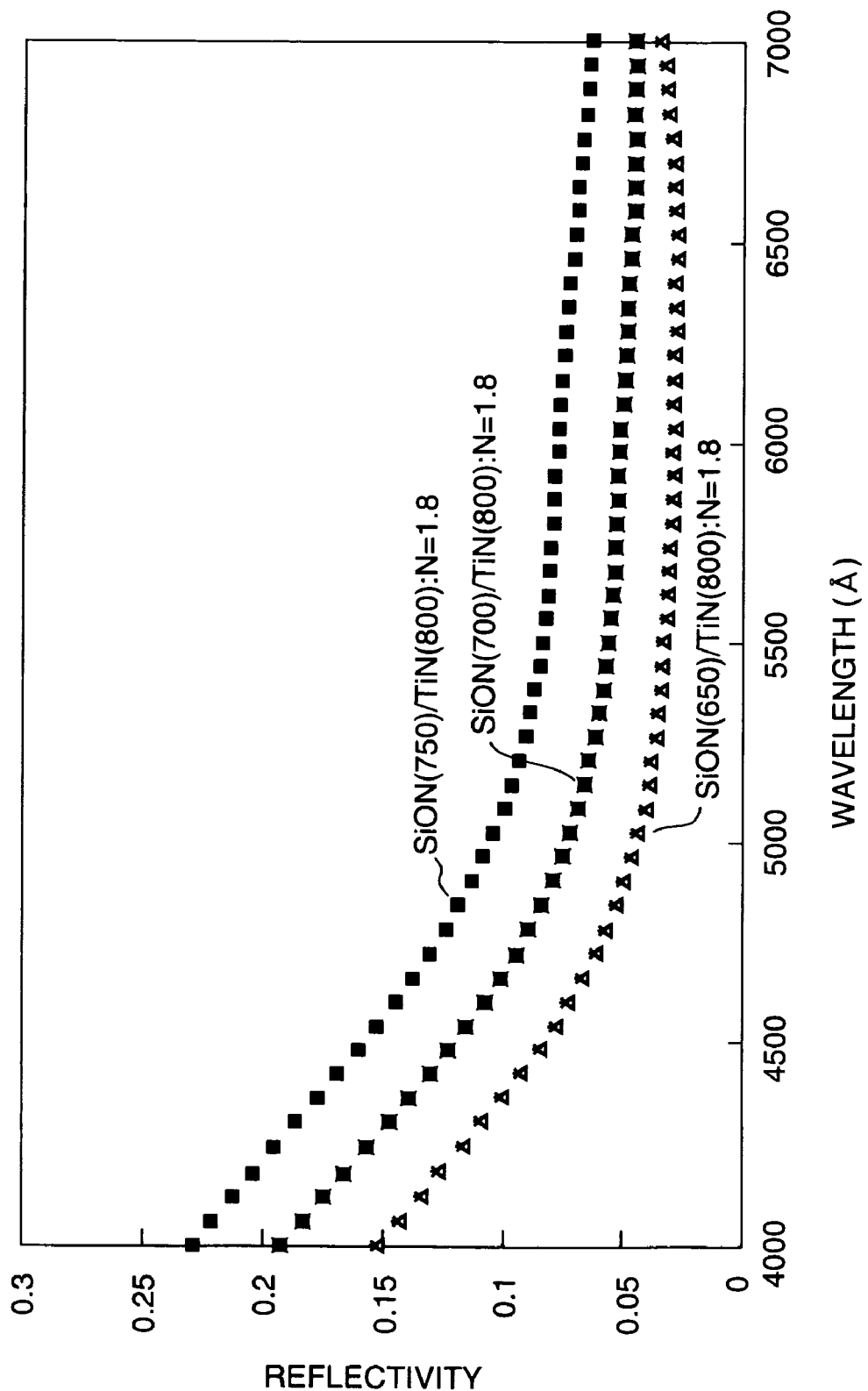
FIG. 8 shows change in reflectivity of the anti-reflection layer in the present invention against change in wavelength, with change in thickness (out of optimum range) for the SiON film.

Curves shown in FIGS. 7 and 8 were also given for comparison of reflectivities under change in SiON-film thickness.

Curves shown in FIG. 7 were given under the conditions: 800 Å (fixed) in thickness of the TiN film and 250 Å, 300 Å and 350 Å in thickness of the SiON film, with 1.8 in refraction index N for the SiON film.

Curves shown in FIG. 8 were given under the conditions: 800 Å (fixed) in thickness of the TiN film and 650 Å, 700 Å and 750 Å in thickness of the SiON film, with 1.8 in refraction index N for the SiON film.

FIGS. 7 and 8 teach that the SiON film having thickness out of the range from 400 to 6000 Å cannot exhibit reflectivity of 10% or less over the wavelength from 4000 to 7000 Å (visible-light range).

Figure 9:
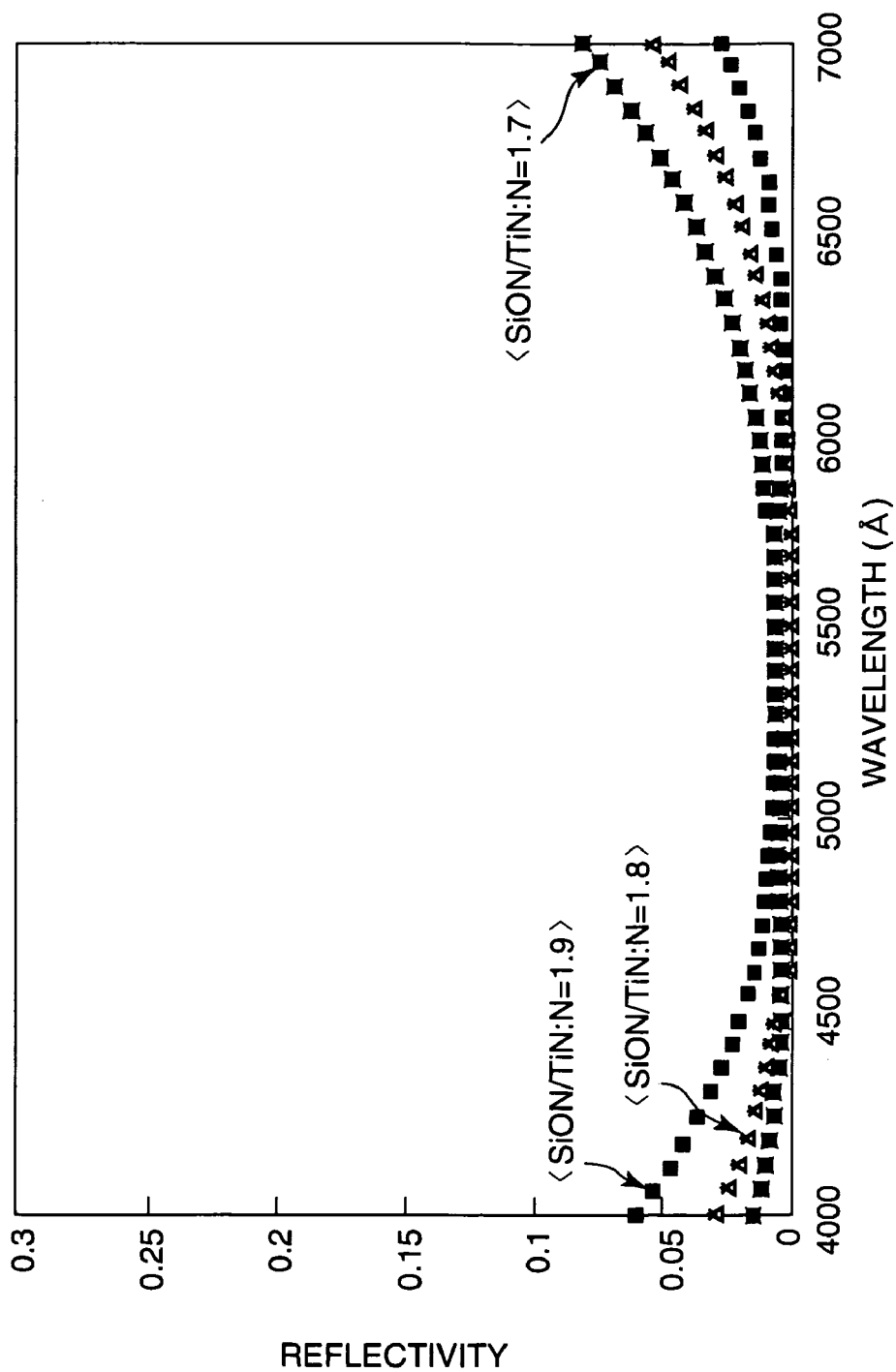
FIG. 9 shows change in reflectivity of the anti-reflection layer in the present invention against change in wavelength, with change in refraction index (in optimum range) for the SiON film.

Discussed next with reference to FIG. 9 is reflectivity of the anti-reflection layer 501 having SiON/TiN double-layer configuration in the present invention against wavelength of visible-light range, with change in refraction index for the SiON film.

Curves shown in FIG. 9 were given under the conditions: 800 Å (fixed) in thickness of the TiN film and 500 Å (fixed) in thickness of the SiON film, with 1.7, 1.8 and 1.9 in refraction index N for the SiON film.

FIG. 9 shows reflectivity (100%=1) of 10% or less over the wavelength in the range from 4000 to 7000 Å at 1.7, 1.8 and 1.9 in refraction index N of the SiON film. The lowest reflectivity was given at 1.8 among the three refraction indices N, with almost 0% at 1.8 against the wavelength from 4700 to 6000 Å.

It is evident from FIG. 9 that the SiON/TiN double-layer configuration in the present invention exhibits higher protection capability against reflection, with refraction index N in the range from 1.7 to 1.9 for the SiON film.

In other words, the SiON/TiN double-layer configuration in the present invention under the conditions defined as above protects pixel switching transistors from intruding light beams incident between pixel electrodes, even for 8.0 μm-pitch pixels. The intruding light beams may otherwise be reflected by the double-layer configuration and finally reach the transistors to decrease the performance thereof, as discussed above.

Figure 10:
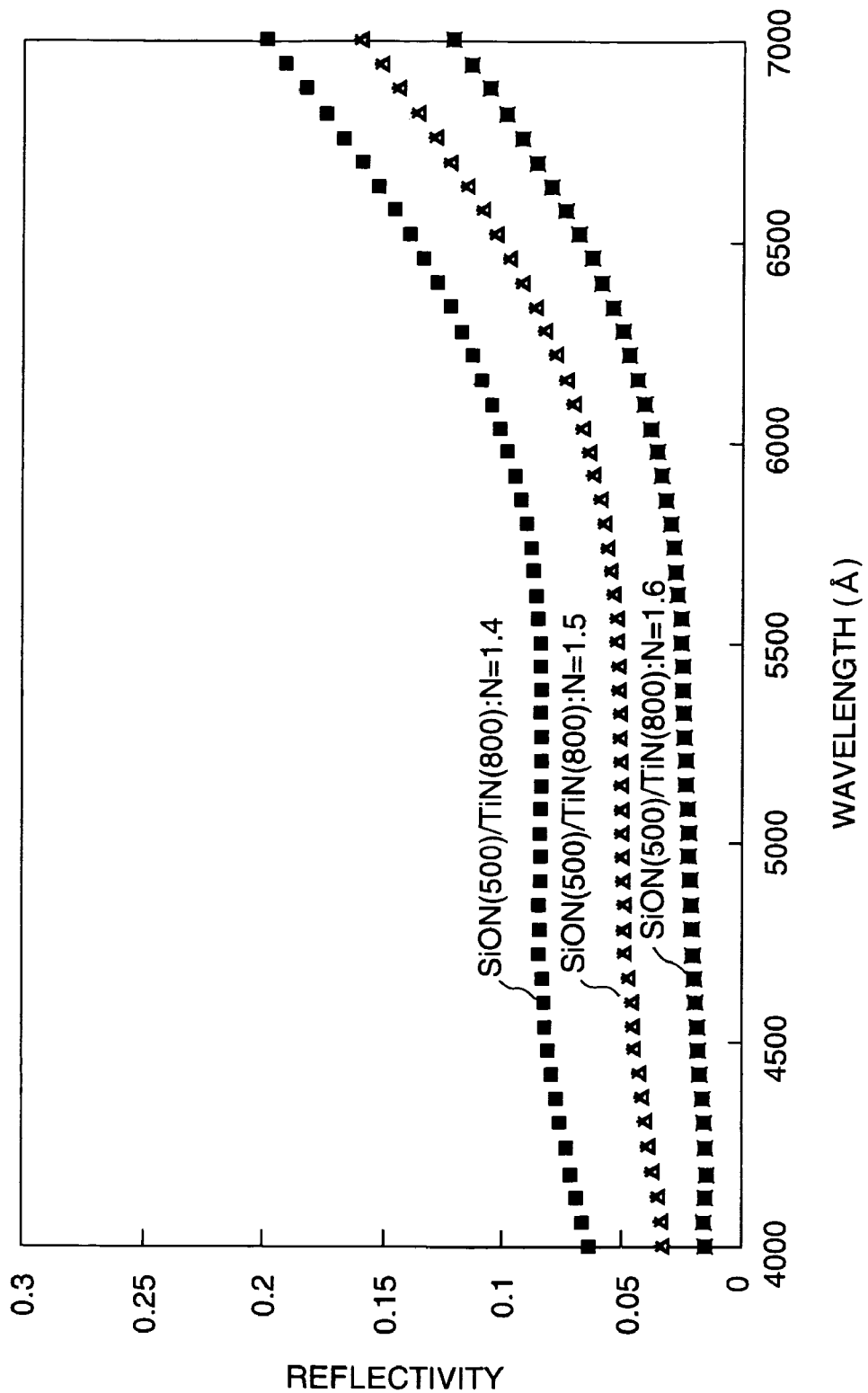
FIG. 10 shows change in reflectivity of the anti-reflection layer in the present invention against change in wavelength, with change in refraction index (out of optimum range) for the SiON film.
Figure 11:
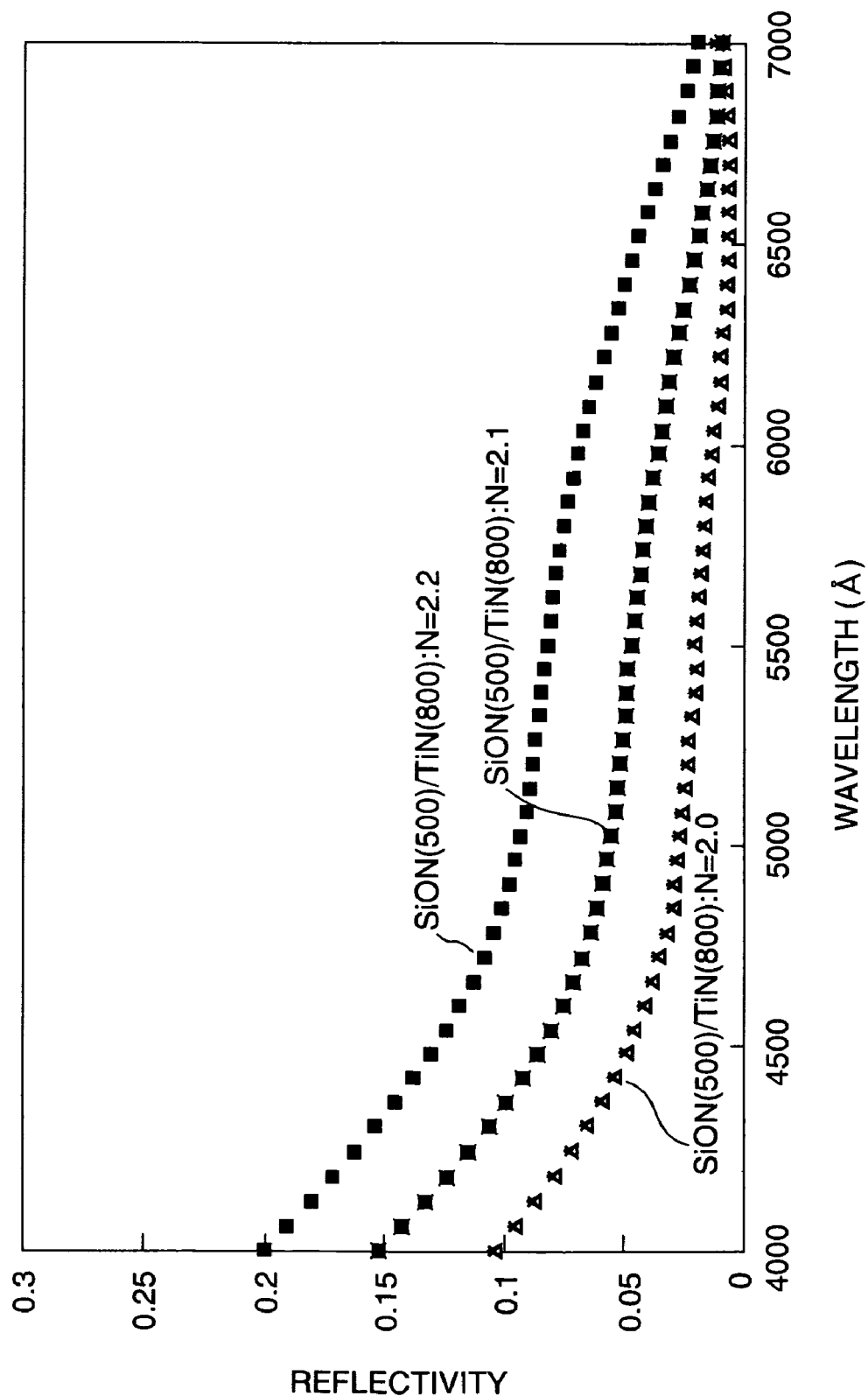
FIG. 11 shows change in reflectivity of the anti-reflection layer in the present invention against change in wavelength, with change in refraction index (out of optimum range) for the SiON film.

Curves shown in FIGS. 10 and 11 were also given for comparison of reflectivities under change in SiON-film refraction index N.

Curves shown in FIG. 10 were given under the conditions: 800 Å (fixed) in thickness of the TiN film and 500 Å (fixed) in thickness of the SiON film, with 1.4, 1.5 and 1.6 in refraction index N for the SiON film.

Curves shown in FIG. 11 were given under the conditions: 800 Å (fixed) in thickness of the TiN film and 500 Å (fixed) in thickness of the SiON film, with 2.0, 2.1 and 2.2 in refraction index N for the SiON film.

FIGS. 10 and 11 teach that the SiON film having refraction index N out of the range from 1.7 to 1.9 cannot exhibit reflectivity of 10% or less over the wavelength from 4000 to 7000 Å (visible-light range).

The evaluations discussed above give the following optimum requirements:

(1) the anti-reflection layer 501 having the double-layer configuration of the TiN film with 800 Å in thickness and the SiON film with 500 Å in thickness and 1.8 in refraction index N; and (2) the anti-reflection layer 501 having the double-layer configuration of the TiN film with 800 Å in thickness and the SiON film with thickness in the range from 400 to 600 Å and refraction index N in the range from 1.7 to 1.9.

The refraction indices N for the SiON film in the requirements (1) and (2) are adjusted as different from N at about 1.45 for the third interlayer insulating layer 341.

The requirements (1) and (2) offer reflectivity of 5% or less and 10% or less, respectively, against read light beams over the wavelength from 4000 to 7000 Å (visible-light range).

Disclosed next are modifications to the reflective liquid crystal display device shown in FIG. 4.

Figure 12:
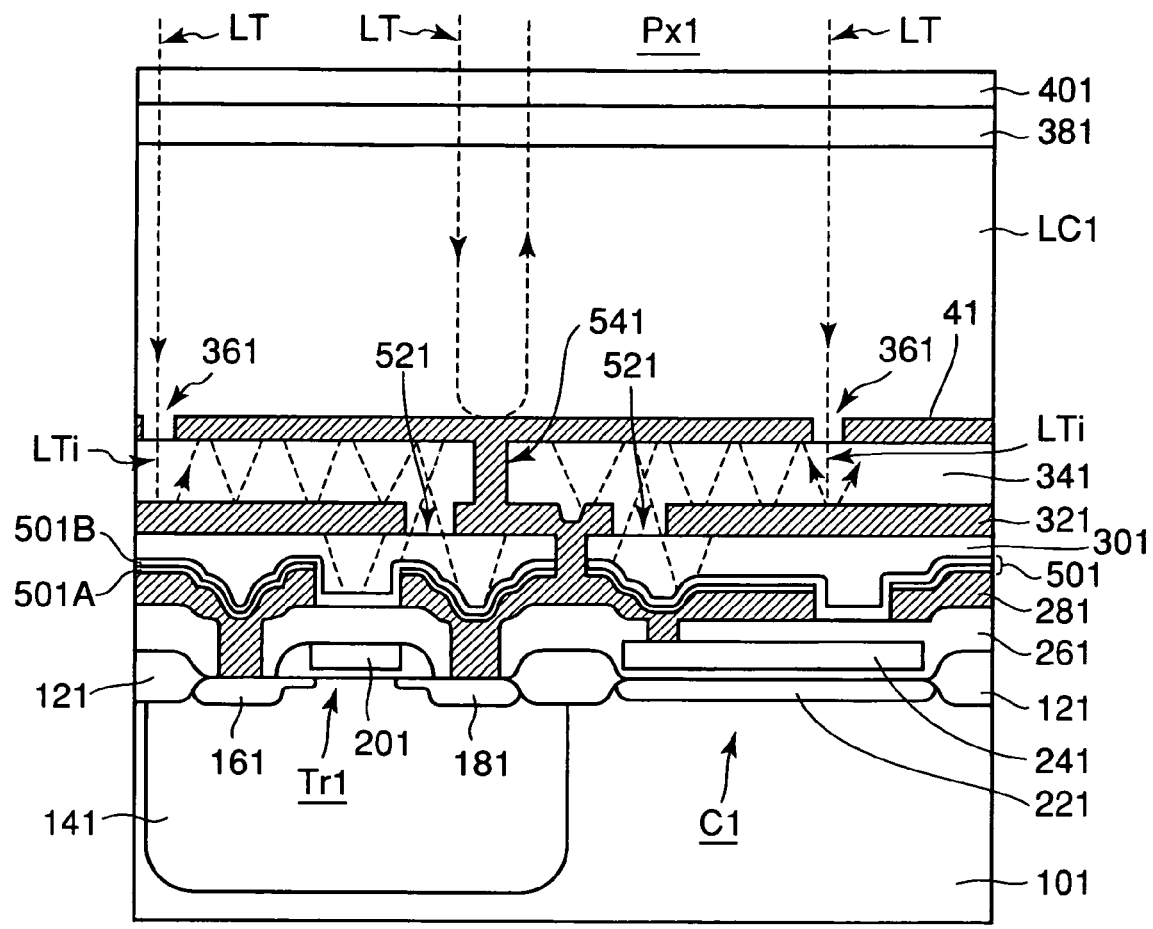
FIG. 12 shows a cross section of a modification to the embodiment of the liquid crystal display device according to the present invention shown in FIG. 4.
Figure 13:
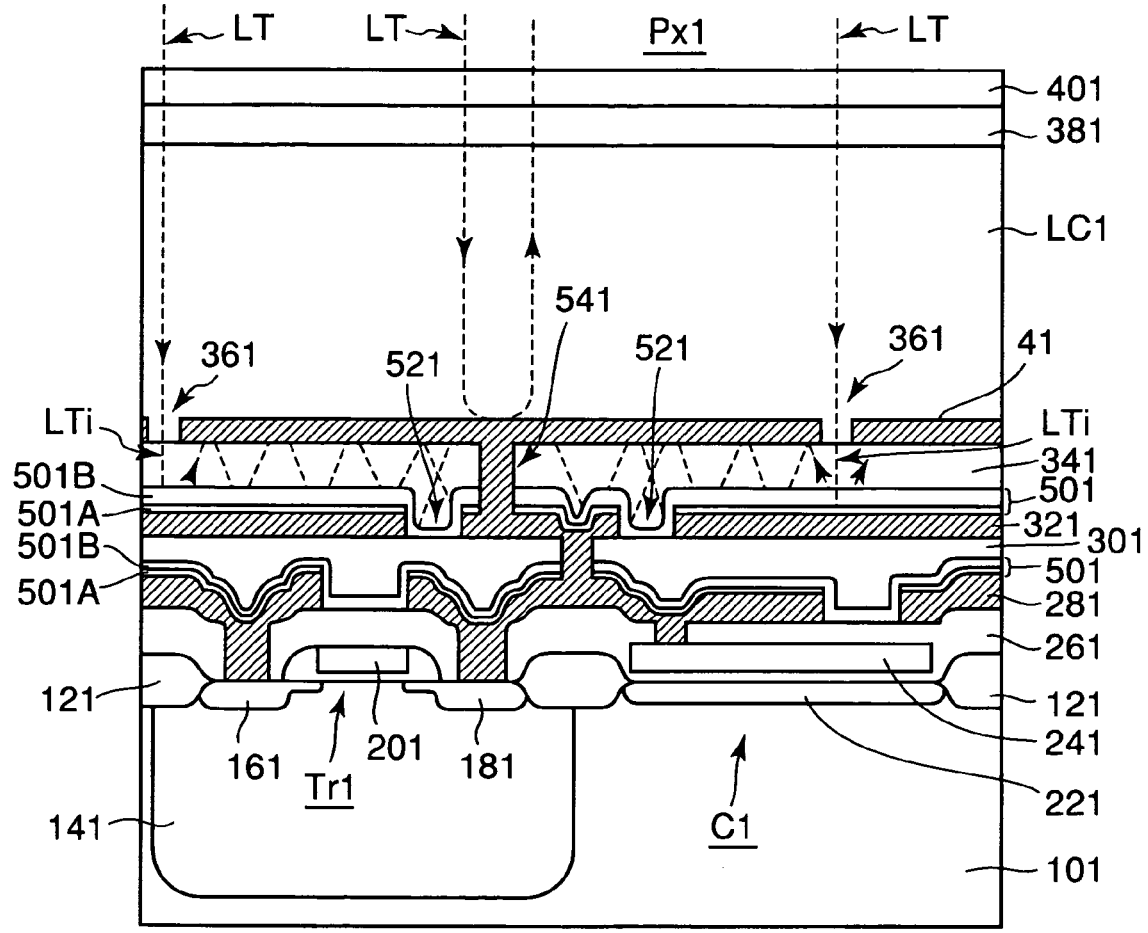
FIG. 13 shows a cross section of another modification to the embodiment of the liquid crystal display device according to the present invention shown in FIG. 4.

FIGS. 12 and 13 show cross sections of modification to the embodiment of the liquid crystal display device according to the present invention.

Elements in FIGS. 12 and 13 the same as or analogous to those shown in FIG. 4 are given the same reference numerals and not explained.

A modification shown in FIG. 12 has the anti-reflection layer 501 formed on the wiring layer 281 but under the light shielding layer 321, different from the counterpart 501 formed on the light shielding layer 321 in the embodiment of FIG. 4.

Another modification shown in FIG. 13 has two anti-reflection layers 501, one formed on the wiring layer 281 and the other on the light shielding layer 321. This modification is advantageous over the embodiment and the former modification on the protection capability against reflection, thus serving further pixel miniaturization.

As disclosed above in detail, the present invention protects pixel switching transistors from intruding light beams, which may otherwise be incident between pixel electrodes, reflected and finally reach the transistors to decrease the performance thereof, thus achieving further pixel miniaturization.

The present invention also achieves reflectivity of 10% or less against read light beams over the wavelength from 4000 to 7000 Å (visible-light range) in reflective liquid crystal display devices with three liquid crystal panels of red, blue and green. This allows common liquid crystal panels be used for red, blue and green, which yields high productivity.

The embodiment and modifications employ a metallic nitride film, or the TiN film 501A, as one of the compositions of the anti-reflection layer 501. Not only that, however, other materials, such as, titanium can be used.

The reflective liquid crystal display device according to the present invention has at least one anti-reflection layer made of a metallic film and a silicon oxynitride film that exhibits a refraction index different from the interlayer insulating layer formed over the protective layer and low reflectivity against light beams which may otherwise be incident into pixel switching transistors to decrease the performance thereof, thus achieving further pixel miniaturization.

What is claimed is:

1. A reflective liquid crystal display device comprising:
   a semiconductor substrate;
   at least one pair of pixel switching transistor and a capacitor formed on the semiconductor substrate and electrically isolated from each other;
   a first interlayer insulating layer formed on the pixel switching transistor and the capacitor;
   a wiring layer formed on the first interlayer insulating layer;
   a second interlayer insulating layer formed over the wiring layer;

a light shielding layer formed on the second interlayer insulating layer, the light shielding layer being divided into a plurality of layer portions by gaps;

a third interlayer insulating layer formed over the light shielding layer;

at least one pixel electrode formed on the third interlayer insulating layer;

a common electrode formed over the pixel electrode;

a liquid crystal layer provided between the pixel electrode and the common electrode;

a light-transmissive substrate formed on the common electrode; and at least one anti-reflection layer formed on the light shielding layer, the anti-reflection layer being a double layer of a metallic film and a film including Si that exhibits a refraction index different from a refraction index of the third interlayer insulating layer, the film including Si covering the gaps of the light shielding layer.

2. The reflective liquid crystal display device according to claim 1, wherein the metallic film is a metallic nitride film.

3. The reflective liquid crystal display device according to claim 1, wherein the metallic film is a titanium film.

4. The reflective liquid crystal display device according to claim 3, wherein the titanium film is a titanium nitride film.

5. The reflective liquid crystal display device according to claim 1, wherein the film including Si is silicon oxynitride film.

6. The reflective liquid crystal display device according to claim 5, wherein the refraction index of the silicon oxynitride film is in the range from 1.7 to 1.9.

7. The reflective liquid crystal display device according to claim 5, wherein a thickness of the silicon oxynitride film is in the range from 400 to 600 Å.

8. The reflective liquid crystal display device according to claim 1, wherein a thickness of the metallic film is small than 300 nm.

9. The reflective liquid crystal display device according to claim 1, wherein a thickness of the metallic film is about 800 Å.

10. A reflective liquid crystal display device comprising:
a semiconductor substrate;
at least one pair of pixel switching transistor and a capacitor formed on the semiconductor substrate and electrically isolated from each other;
a first interlayer insulating layer formed on the pixel switching transistor and the capacitor;
a wiring layer formed on the first interlayer insulating layer, the wiring layer being divided into a plurality of layer portions by gaps;
a second interlayer insulating layer formed over the wiring layer;
a light shielding layer formed on the second interlayer insulating layer;
a third interlayer insulating layer formed over the light shielding layer;
at least one pixel electrode formed on the third interlayer insulating layer;
a common electrode formed over the pixel electrode;
a liquid crystal layer provided between the pixel electrode and the common electrode;
a light-transmissive substrate formed on the common electrode; and
at least one anti-reflection layer formed on the wiring layer, the anti-reflection layer being a double layer of a metallic film and a film including Si that exhibits a refraction index different from a refraction index of the third interlayer insulating layer, the film including Si covering the gaps of the wiring layer.

11. The reflective liquid crystal display device according to claim 10, wherein the metallic film is a metallic nitride film.

12. The reflective liquid crystal display device according to claim 10, wherein the metallic film is a titanium film.

13. The reflective liquid crystal display device according to claim 12, wherein the titanium film is a titanium nitride film.

14. The reflective liquid crystal display device according to claim 10, wherein the film including Si is silicon oxynitride film.

15. The reflective liquid crystal display device according to claim 14, wherein the refraction index of the silicon oxynitride film is in the range from 1.7 to 1.9.

16. The reflective liquid crystal display device according to claim 14, wherein a thickness of the silicon oxynitride film is in the range from 400 to 600 Å.

17. The reflective liquid crystal display device according to claim 10, wherein a thickness of the metallic film is smaller than 300 nm.

18. The reflective liquid crystal display device according to claim 10, wherein a thickness of the metallic film is about 800 Å.

19. A reflective liquid crystal display device comprising:
a semiconductor substrate;
at least one pair of pixel switching transistor and a capacitor formed on the semiconductor substrate and electrically isolated from each other;
a first interlayer insulating layer formed on the pixel switching transistor and the capacitor;
a wiring layer formed on the first interlayer insulating layer, the wiring layer being divided into a plurality of layer portions by gaps;
a second interlayer insulating layer formed over the wiring layer;
a light shielding layer formed on the second interlayer insulating layer, the light shielding layer being divided into a plurality of layer portions by gaps;
a third interlayer insulating layer formed over the light shielding layer;
at least one pixel electrode formed on the third interlayer insulating layer;
a common electrode formed over the pixel electrode;
a liquid crystal layer provided between the pixel electrode and the common electrode;
a light-transmissive substrate formed on the common electrode;
a first anti-reflection layer formed on the wiring layer, the first anti-reflection layer being a double layer of a metallic film and a first film including Si that exhibits a refraction index different from a refraction index of the third interlayer insulating layer, the first film including Si covering the gaps of the wiring layer; and
a second anti-reflection layer formed on the light shielding layer, the second anti-reflection layer being a double layer of a metallic film and a second film including Si that exhibits a refraction index different from a refraction index of the third interlayer insulating layer, the second film including Si covering the gaps of the light shielding layer.

20. The reflective liquid crystal display device according to claim 19, wherein each metallic film is a metallic nitride film.

21. The reflective liquid crystal display device according to claim 19, wherein each metallic film is a titanium film.

22. The reflective liquid crystal display device according to claim 21, wherein the titanium film is a titanium nitride film.

23. The reflective liquid crystal display device according to claim 19, wherein each film including Si is silicon oxynitride film.

24. The reflective liquid crystal display device according to claim 23, wherein the refraction index of the silicon oxynitride film is in the range from 1.7 to 1.9.

25. The reflective liquid crystal display device according to claim 23, wherein a thickness of the silicon oxynitride film is in the range from 400 to 600 Å.

26. The reflective liquid crystal display device according to claim 19, wherein a thickness of each metallic film is smaller than 300 nm.

27. The reflective liquid crystal display device according to claim 19, wherein a thickness of each metallic film is bout 800 Å.

* * * * *